Figure 1:
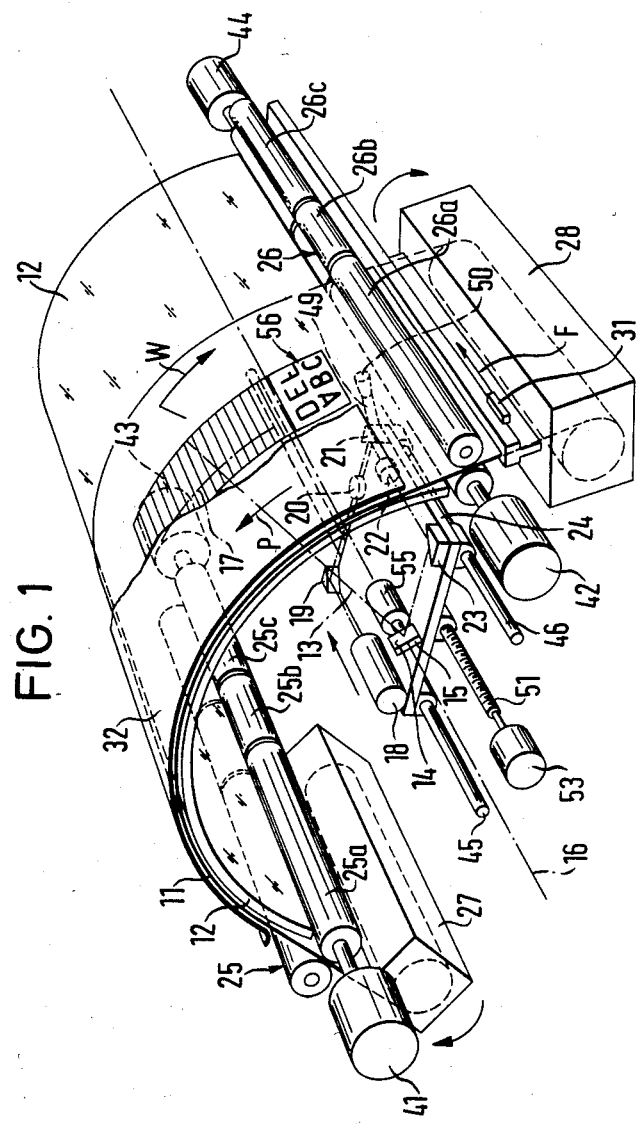

United States Patent [19]

Holthusen

[11] Patent Number: 4,595,957
[45] Date of Patent: Jun. 17, 1986

[54] OPTICAL LIGHT BEAD SCANNING ARRANGEMENT

[75] Inventor: Bernd Holthusen, Hamburg, Fed. Rep. of Germany

[73] Assignee: Dr. Boger Photosatz GmbH, Wedel Bei Hamburg, Fed. Rep. of Germany

[21] Appl. No.: 610,442

[22] Filed: May 15, 1984

[30] Foreign Application Priority Data

May 19, 1983 [DE] Fed. Rep. of Germany ....... 3318311

[51] Int. Cl.$^4$ ............................................. H04N 1/06
[52] U.S. Cl. .................................... 358/290; 358/304
[58] Field of Search ............... 358/296, 302, 290, 300, 358/208, 206, 292, 304; 346/160, 108, 76 L; 355/16

[56] References Cited

U.S. PATENT DOCUMENTS

| 3,588,335 | 6/1971 | Harris | 358/300 |
|---|---|---|---|
| 3,610,824 | 10/1971 | Hansen | 358/300 |
| 4,168,506 | 9/1979 | Corsover | 346/108 |
| 4,206,482 | 6/1980 | De Lavalette et al. | 358/290 |
| 4,257,053 | 3/1981 | Gilbreath | 346/108 |

FOREIGN PATENT DOCUMENTS

| 2309101 | 9/1973 | Fed. Rep. of Germany . |
| 2325456 | 11/1973 | Fed. Rep. of Germany . |
| 3126642 | 6/1982 | Fed. Rep. of Germany . |

OTHER PUBLICATIONS

Sherman; "Internal Drum Laser Scanning Plate Exposure System"; Jan. 1979, SPIE, vol. 169, pp. 42–47.

Primary Examiner—Edward L. Coles, Sr.
Attorney, Agent, or Firm—Townsend & Townsend

[57] ABSTRACT

Photocomposition apparatus comprises a modulated laser for generating a modulated laser beam; a holder for the photosensitive material, with the holder having the shape of a segment of a cylinder whereby the photosensitive material in the holder adopts a partially cylindrical shape; an optical image forming system and a rotatable mirror arrangement mounted on a carriage, by means of which the rotatable mirror arrangement can be displaced with its axis of rotation coaxial to the cylinder axis of the holder along this cylinder axis. The laser beam which falls on the rotatable mirror arrangement via the optical image forming system, and which is substantially radially directed towards the photosensitive material in the holder after reflection at the rotatable mirror scans the photosensitive material linewise as a result of rotation of the rotatable mirror and displacement of the carriage along the cylinder axis of the holder, and thereby generates a desired latent pattern in the photosensitive material. The laser is arranged on the carriage and the carriage, the laser, the optical image forming system, the rotatable mirror arrangement and also any other light deflecting parts which are present are preferably arranged essentially in a plane which extends parallel to a plane containing the two ends of the holder.

15 Claims, 4 Drawing Figures

OPTICAL LIGHT BEAD SCANNING ARRANGEMENT

The invention relates to an optical light bead scanning arrangement for use in photocomposition apparatus with photosensitive material.

One light bead scanning arrangement suitable for this purpose is known from DE-OS No. 31 26 642. This known apparatus comprises a modulated laser for generating a modulated laser beam; a holder for the photosensitive material, the holder having the shape of a segment of a cylinder, whereby the photosensitive material in the holder adopts a partially cylindrical shape; an optical image forming system; and a rotatable mirror arrangement mounted on a carriage by means of which the rotatable mirror arrangement can be displaced with its axis of rotation coaxial to the cylinder axis of the holder, along this cylinder axis. The laser beam, which falls on the rotatable mirror arrangement via the optical image forming system and which is substantially radially directed towards the photosensitive material in the holder after reflection at the rotatable mirror, scans the photosensitive material linewise as a result of rotation of the rotatable mirror and displacement of the carriage along the cylinder axis of the holder. In this way the laser beam generates a desired latent pattern in the photosensitive material.

This known apparatus has certain advantages when compared with light bead scanning arrangements which have previously been used in photocomposition apparatus.

In other known optical light bead scanning arrangements (for example German Offenlegungsschrift No. 30 47 813) expensive and complicated optical correction devices are generally necessary in order to ensure problemfree exposure of the photosensitive web material which is arranged in one plane. In these previously known optical light bead scanning arrangements the photosensitive web material is exposed in the flat state because it is first transferred from the roll of material into a take-up cassette and is then exposed. The laser beam scans the flat web material located in the take-up cassette line for line transverse to its longitudinal extent. This process can take place one line at a time or several lines at a time, and in both directions. The text can also be exposed linewise in columns or in compositions from the top to the bottom and thus photocomposited.

In the arrangement of the German Offenlegungsschrift DE-OS No. 31 26 642, which is intended for the exposure of sheet material, the optical geometry is extensively simplified and the angular speed of the scanning process is held constant by the cylindrical shape of the mounted sheet of material and by the arranagement of the rotatable mirror at the cylinder axis of the holder, so that expensive and complex optical correction devices are no longer necessary.

Despite this improvement special measures have to be taken with the initially named light bead scanning device in order to obtain a latent pattern with ideal definition.

The principal object underlying the present invention is to so improve the initially named apparatus that a sharp, problemfree and accurate quality image of the laser light bead on the photosensitive material is ensured in simple and uncomplicated manner, together with a compact construction, and indeed even in photocomposition apparatus which operates with photosensitive material in roll film or web form. If required, exposure of photosensitive material over a peripheral angle of approximately 180° should also be possible.

In order to satisfy this object it is proposed, in accordance with the invention, that the laser should also be arranged on the carriage.

Because the laser is located on the carriage the optical geometry of the entire arrangement remains fixed during scanning so that lack of definition due to change in optical geometry cannot arise in the first place. Furthermore, gradual divergence of the laser beam with increasing distance from the laser does not lead to a reduction of the quality of the imaging process because, in the arrangement of the invention, the optical distance between the laser and the material which is to be exposed remains constant and any divergence which is present can be corrected by means of a simple correction lens. Furthermore, differential oscillations of the laser and the carriage can no longer occur because the laser is mounted on the carriage, so that lack of definition which could attributed to this source is precluded.

The apparatus can be made particularly compact if, in accordance with the preferred arrangement, the laser, the optical image forming system, and also any parts which are present which deflect the light beam, are disposed in a shallow arrangement on the carriage, with the carriage extending parallel to a plane containing the two ends of the holder. This arrangement is particularly compact, not only because the laser does not have to be mounted remote from the carriage, but also because the carriage and the parts mounted thereon can be housed in a shallow space-saving construction at the base of the holder.

Thus the laser beam can be accurately focussed onto the photosensitive layer.

A particularly favourable arrangement is characterised by the arrangement on the carriage of: the laser which is positioned alongside the rotatable mirror substantially parallel to its axis of rotation, then a 90° deflecting mirror, then a laser modulator, then a further 90° deflecting mirror, optionally a correction objective and, finally, on the side of the rotatable mirror remote from the laser, a further deflecting element which deflects the laser beam to the rotatable mirror.

In this way the space available beneath the holder is ideally exploited by a particularly shallow arrangement of the various elements on the carriage.

The laser beam preferably falls on the rotatable mirror arrangement in a direction which coincides with the cylinder axis of the holder. In this embodiment the rotatable mirror arrangement preferably comrises a rotatable mirror with a flat mirror surface which subtends an angle of 45° to the cylinder axis of the holder.

In this manner it is possible, provided the rotational axis of the rotatable mirror arrangement lies above the laterally adjacent parts on the carriage, to achieve an effective scanning or exposure of the photosensitive material over a peripheral angle of 180° or even more. This arrangement of the rotatable mirror can be achieved either by providing free spaces to the left and to the right of the rotatable mirror, or by first displacing the laser beam upwardly before it impinges on the rotatable mirror. This can for example be achieved by deflecting the laser beam onto the rotatable mirror via a prism the plane of which has been tilted relative to the carriage and which brings about a deflection of the light beam through approximately 180°.

In a preferred practical embodiment it is envisaged that the material is present in the form of a web which comes from a supply cassette arranged at one end of the holder, which is constructed as a segment of a cylinder, is guided along the segment of the cylinder and is received by a take-up cassette at the other end of the holder. In this manner the supply and take-up cassettes can be housed in a space-saving manner without the overall dimensions of the apparatus having to be substantially enlarged. The cylinder segment is advantageously transparent and the web material is then laid externally around the cylinder segment. The cylinder segment thus determines the shape of the flexible web material.

In order to ensure troublefree scanning with the rotating mirror arrangement the cylinder segment should preferably extend over an angle of 100° to 180° and in particular over an angle of 180°. In general, the cylinder segment consists of a segment of a glass cylinder which extends in the peripheral direction over approximately 180°.

It is advantageous for the longitudinal axis of the web material to extend in an arc around the cylinder segment. In other words the web material should be guided in its longitudinal direction around the cylinder segment so that the longitudinal axis and longitudinal lines extending parallel thereto extend parallel to peripheral or circumferential lines of the cylinder segment. Lines which are at right angles to the longitudinal axis and which lie in the surface of the web material extend in contrast parallel to the generator of the cylinder segment and to the cylinder axis of the cylinder segment. Thus, in the system of the invention, in contrast to the previously known arrangement (German Offenlegungsschrift No. 30 47 813), text and pictures are no longer scanned by the laser beam transverse to the longitudinal direction of the photosensitive web material but instead in the longitudinal direction thereof, i.e. from the top to the bottom and no longer in the horizontal direction. This arrangement ensures that the photosensitive web material is curved in accordance with its natural direction of curvature which it already had on the supply coil and which it will again adopt on the take-up coil.

For the purpose of troublefree transport of the photosensitive web material over the cylinder segment pairs of supply rollers and of take-off rollers should be provided at the ends of the cylinder segment and should extend parallel to the cylinder axis.

With this arrangement at least the take off rollers should be driven by a motor. The supply rollers are however also preferably driven by a motor.

The construction in accordance with the invention makes it possible for the pairs of supply rollers and take-off rollers to be subdivided in their longitudinal direction into several differentially drivable and/or idler sections. In this way a particularly advantageous characteristic of the arrangement of the invention is exploited, namely that the width of the format is not important. Thus, if the apparatus is laid out for the widest possible format, then the possibility exists of feeding two different photosensitive material webs with the same or different material width through the apparatus. This is for example important in the case when correction is to be made on paper and the final exposure is to be made on film for transfer to an offset plate. The pair of rollers then have a common core of 500 mm width with one section being 250 mm wide and being driven by a motor. In the central zone there is then a loose idler piece of 70 mm width. At the end there is again a driven piece of 180 mm width. In this manner web material with a maximum width of 500 mm can be transported by synchronously driving all the motors. Two material webs each of 205 mm width (standard) can also be exposed alongside one another. Furthermore, it is possible to expose a web material of 300 mm width alongside a narrow format of 70 mm width.

At least one supply cassette and at least one take-up cassette are expediently arranged before the pair of supply rollers and after the pair of take-up rollers respectively.

The arrangement is preferably such that the width of the cassettes is the same as the width of one of said sections or of a plurality of adjacent sections.

In order to be able to work with cassettes of different sizes a further embodiment is preferably laid out so that a cassette chamber is provided which is intended to receive the largest possible size of cassette and which can be reduced to the smaller cassette size.

In order to separate the photosensitive web material transferred into the take-up cassette from web material still located on the cylinder segment it is expedient to place a cutting device between the take-off rollers and the take-up cassette or the take-up cassettes.

In order to protect the photosensitive material in a light tight manner from the outside and against damage a light impermeable guide cover is preferably disposed externally around the cylinder segment and is spaced therefrom.

In order to make the web material which is laid around the cylinder segment accessible, for example in the event of breakdown, a further embodiment provides for the guide cover to be pivotally mounted about a pivot axis extending parallel to the cylinder axis for upward pivotal movement away from the holder.

Figure 2:
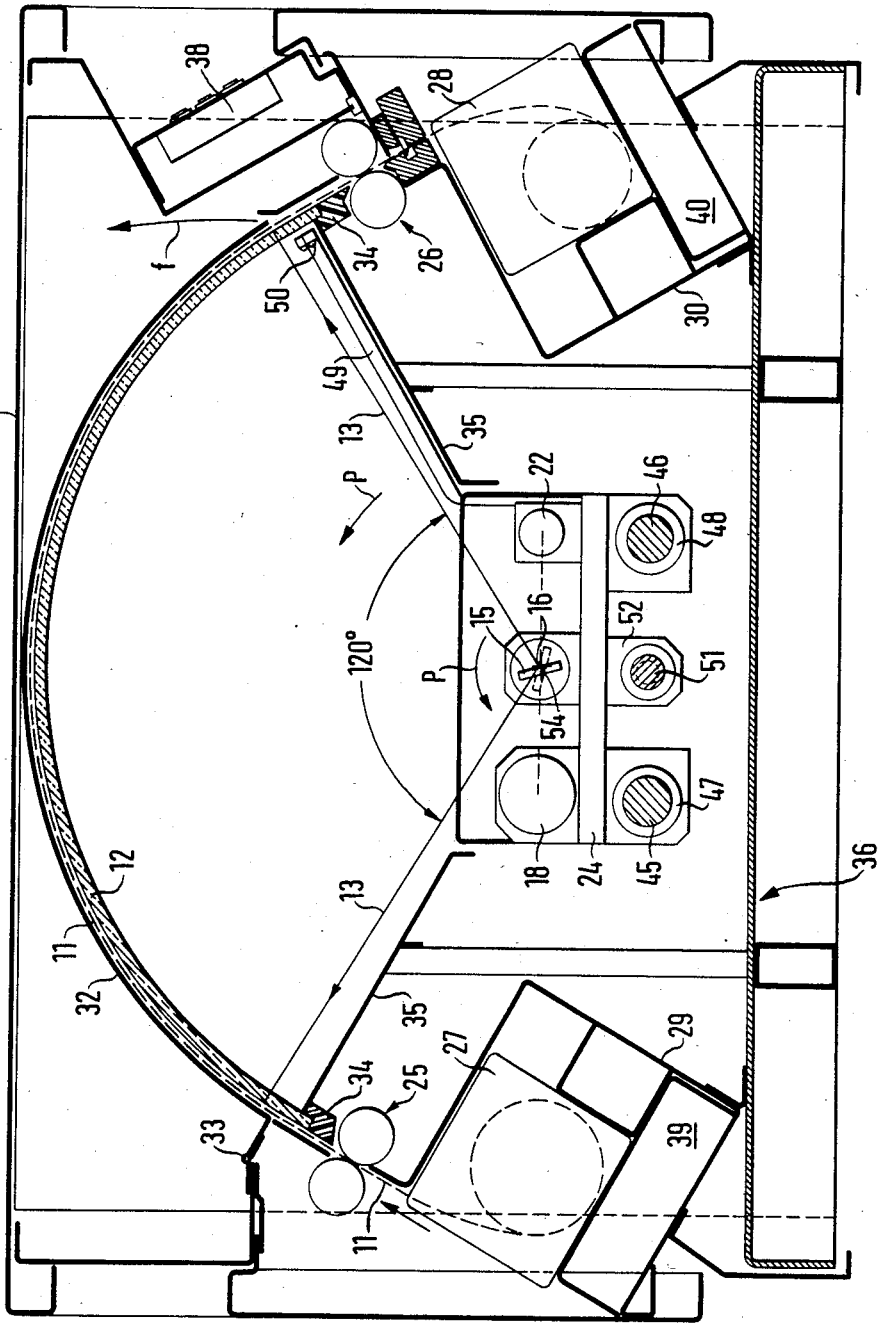
Figure 3:
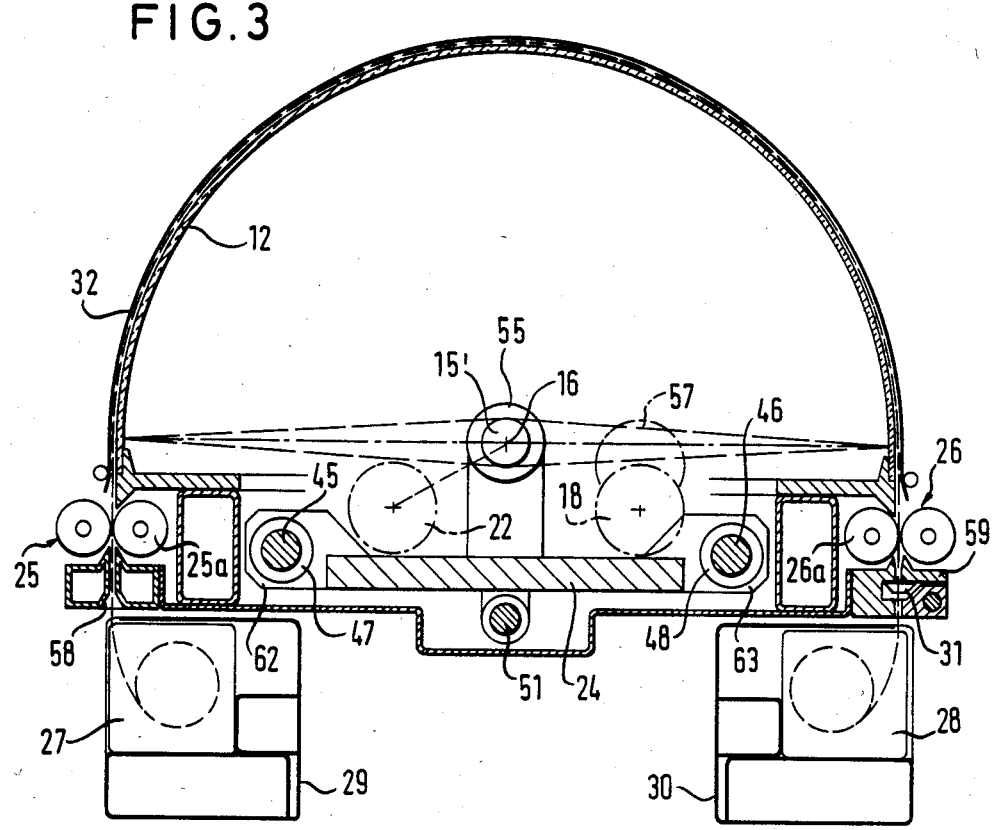
Figure 4:
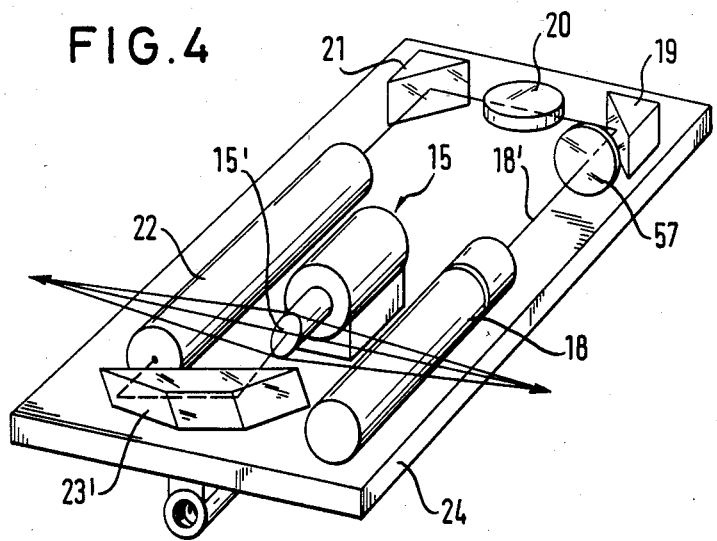

The invention will now be described by way of example only and with reference to the drawings which show:

FIG. 1 a schematic partly broken away perspective view of an optical light bead scanning arrangement for use in photocomposition apparatus with photosensitive material, FIG. 2 an axial section of the optical light bead scanning apparatus of FIG. 1, in which however more detail is shown, FIG. 3 an end view of a further preferred embodiment which makes it possible to expose the photosensitive material over a peripheral angle of 180°, and FIG. 4 a perspective view of the carriage of the embodiment of FIG. 3.

As seen in FIGS. 1 and 2 a segment of a cylinder 12 which is made of glass extends around its cylinder axis 16 above the latter over an angle of 120°. At its peripheral ends the cylinder segment 12 is mounted in synthetic strips 34 (FIG. 2) which are in turn fastened to the frame 36 of the apparatus via substantially radially extending sheet metal supports 35. The cylinder segment 12 is surrounded by a guide cover 32 which is spaced a small distance from the cylinder segment and likewise has the shape of a segment of a cylinder. As seen in FIG. 2 the guide cover is pivotally journalled in the region of the left hand peripheral end of the cylinder segment 12 about a pivot axle 33 which extends parallel to the cylinder axis 16. In this way the guide cover 32 can be pivoted upwardly in the direction of the arrow f or FIG. 2 provided the cover 37 of the apparatus has previously been taken off or swung open.

An operator control panel 28 is located at the front side of the apparatus as seen in FIG. 2.

In the rear area of the apparatus a pair of supply rollers 25 is provided immediately before the cylinder segment 12, with the axes of the pair of supply rollers extending parallel to the cylinder axis 16. A pair of take-off rollers 26 is accommodated in corresponding manner at the opposite peripheral end of the cylinder segment 12 in the front region of the apparatus.

Cassette receiving chambers 29, 30 in which supply cassettes 27 and take-up cassettes 28 of different sizes can be housed, are respectively provided beneath the pair of supply rollers 25 and the pair of take-off rollers 26.

As seen in FIG. 2 smaller cassettes 27, 28 with a cross-section of 100 mm$^2$ are arranged by means of adaptors 39 and 40 in the cassette receiving chambers 29, 30 which are laid out for cassettes with a cross-section of 140 mm$^2$.

Despite the relative large cassette receiving chambers 29 and 30 the overall apparatus only has a depth of approximately 75 cm for a height of just 50 cm. The width (FIG. 1) is approximately 70 cm. These dimensions are based on a large format exposure surface of 500 by 600 mm. In this case the periphery of the cylinder segment 12 is 600 mm while the axial extent of the cylinder segment 12 amounts to 500 mm.

Photosensitive web material 11 is unrolled from the supply cassette 27 and laid around the cylinder segment 12. In doing so the web material 11 is passed through the pair of supply rollers 25 and through the pair of take-off rollers 26. It then finally enters the take-up cassette 28 where it is once again rolled up.

As seen in FIGS. 1 and 2 a cutting device 31 for the photosensitive material is located between the pair of take-off rollers 26 and the take up cassette 28. The cutting device 31 consists of a knife which is movable in the transverse direction of the web in the direction of the arrow F (FIG. 1) in order to separate the photosensitive material which is already located in the take-up cassette 28 from the web material which is still lying on the cylinder segment 12.

As seen in FIG. 1 the pair of supply rollers 25 and the pair of take-off rollers 26 each have three sections 25a, 25b, 25c and 26a, 26b, 26c. The left hand roller pairs 25a, 26a as seen in FIG. 1 are each driven by motors 41, 42. In each case the drive only acts on one roller of the pair of rollers, and indeed on the inner roller.

The roller pairs 25a, 26a expediently have a length of 250 mm. There then follows a shorter roller pair section 25b, 26b with a length of approximately 70 mm. This roller pair section is not driven but instead idles freely. At the end there are then further roller pair sections 25c, 26c which are driven by motors 43 and 44 respectively. In this case only the inner roller section is driven by one of the motors 43, 44.

The drawing shows how a photosensitive web material of 205 mm width is guided through the first roller pair sections 25a and 26a around the left hand half of the cylinder segment 12. The guide cover 32 is partly broken away in order to illustrate the web material.

In the interior of the cylinder segment 12 there is located a carriage 24 which is axially guided on two guide bars 45, 46 which extend parallel to the cylinder axis 16. The carriage 24 is guided on the guide bars 45, 46 by means of ball bushings 47, 48 (FIG. 2). A photo-transistor 50 is secured to the carriage via an arm 49 and cooperates with marks which are not shown at the front peripheral edge of the cylinder segment 12 in order to synchronise the movement of the carriage 24 in the axial direction with the scanning movement of the laser beam 13 which has yet to be described. The carriage is driven in the axial direction 16 by a spindle 51 which is rotatably arranged in a nut 52 (FIG. 2) secured to the carriage 24. A motor 53 (FIG. 1) drives the spindle 51 in a controlled manner so that it executes a rotational movement.

As seen in FIGS. 1 and 2 a laser 18 is arranged on the carriage 24 parallel to the cylindrical axis 16. The laser 18 directs a light beam parallel to the cylinder axis 16 to a 90° deflecting mirror 19 which deflects the laser beam inwardly to a laser modulator 20. The laser beam which is modulated in the sense of the script which is to be generated then reaches a further 90° deflecting mirror 21 which again deflects the beam through 90° so that it once again extends parallel to the beam emerging from the laser 18 but in the opposite direction thereto. The beam then passes through a correction objective 22 onto a further 90° deflecting mirror 23 which again turns the laser beam in a direction of the laser 18. A rotatable mirror 15, the axis of rotation 54 of which coincides with the cylinder axis 16 and lies in the mirror surface 14, is located between the laser 18 and the deflecting mirror 23. A motor 55 drives the rotatable mirror 15 so that it executes a continuous rotational movement. In this manner a radially extending laser beam 13 is directed onto the inwardly facing photosensitive layer of the photosensitive web material 11.

In FIG. 2 the two positions of the rotatable mirror 15 have been drawn in which correspond to the two extreme angular positions of the radial laser beam 13 which are separated by an angle of 60°. By continuous rotation of the rotatable mirror 15 the photosensitive web material 11 is thus continuously scanned by the laser beam 13 between the two extreme positions shown in FIG. 2. By advancing the carriage 24 by a small amount after each angular scan of the rotatable mirror 15 the entire width of the web material 11 can be scanned columnwise or linewise by the laser beam 13. By suitable modulation a latent image is then generated on the photosensitive web material as is schematically illustrated at 56 in FIG. 1.

It is important that the central longitudinal axis 17 of the web material is laid circularly around the cylinder segment 12 so that the photomaterial is arranged in the natural direction or curvature and is faultlessly exposed in this position.

It can be seen from FIG. 2 that pivoting of the rotatable mirror 15 through an angle of 60° corresponds to a deflection of the laser beam 13 through 120°. Both the laser beam 13 and also the rotatable mirror move counter-clockwise as seen in FIGS. 1 and 2 in the direction of the arrow P. The web material is in contrast moved in the direction of the arrow W of FIG. 1.

Prior to exposure the web material is drawn from the supply cassette 27 and laid around the cylinder segment 12. The photosensitive material 11 is then at rest while the exposure is carried out.

By means of the electronics which controls the deflection of the laser beam 13 and the advance of the carriage 24 it is possible, as a result of a suitable organisation of the memory to pre-sort the text and image parts which are to be exposed so that, using a suitable program, the images cannot only be exposed in the manner shown in the drawing, in the direction of advance of the photosensitive web material, but also in a direction at 90° to the scanning direction of the laser beam, i.e. in the axial direction.

The carriage 24 starts, for the purpose of the exposure, from the front right hand corner shown in the illustration of FIG. 1, once the photosensitive material has entered and been laid around the cylinder segment 12. The scanning laser beam 13 is synchronised by the phototransistor 50 which is connected with the carriage 24. The carriage moves continuously or stepwise during the exposure from the front to the rear as seen in FIGS. 1 and 2. The drive of the carriage 24 can also take place via a steel band.

The use of a single mirror 15 has the advantage, when compared with poloygonal prisms or mirror wheels, that the beam can be accurately projected without the drum axis wandering.

As the system of the invention is technically so conceived that the width of the format is unimportant, the apparatus is preferably laid out for the largest format which is to be proccssed of 500 by 600 mm. In order to sensibly exploit the particularly wide material guide the system of the invention provides, for the first time, the possibility of guiding two different materials with the same or different material width in the system. This is very important when the correction is to take place on paper and the final exposure is to take place on film for transfer to an offset plate.

The rollers of the roller pairs 25 and 26 have a common core of 500 mm width onto which the mentioned roller pair sections 25a, 25b, 25c and 26a, 26b, 26c respectively are arranged. The axes of the rolls of web material in the cassettes 27, 28, of the roller pairs 25, 26 and the cylinder axis 16 thus all extend parallel to one another and to the direction of movement of the carriage 24.

A substantial advantage of the arrangement of the invention lies in the fact that it is possible to carry out the exposure on stationary photosensitive material.

As a result of the large deflection 60° with this optical device 1/6 of the total revolution of the rotatable mirror 15 is used for the projection of the light bead and one can advantageously renounce the use of a polygonal mirror.

An even larger deflection is possible with the embodiment of FIGS. 3 and 4. In this embodiment the same reference numerals are used to designate parts which have counterparts in the embodiment of FIGS. 1 and 2.

The spatial arrangement of the embodiment of FIGS. 3 and 4 is however somewhat different in order to make it possible to achieve the desired scanning (exposure) over a peripheral angle of 180°. In the first place the part-cylindrical holder 12 extends over somewhat more than 180° so that the web to be exposed can be scanned over the desired angle of 180°. The holder thus has the shape of a half cylinder which offers the great advantage that the plane of the supply cassette 29 extends parallel to the plane of the take-up cassette, which results in a simple symmetrical construction of the transport mechanism. At the input side the transort mechanism comprises the cassette 27, the guide 58 and the pair of infeed rollers 25. At the output side the transport mechanism comprises the pair of take-off rollers 26, the guide 59 which extends through the cutting device 31 and the take-up cassette 28. The axially symmetric construction makes it possible to change the supply and take-up cassetes as desired which simplifies the mechanical situation if a later on-line development system is to be added. The semi-cylindrical arrangement also represents a very compact construction in height and depth.

A special layout is provided on the carriage in order to enable scanning through 180°. This layout can be seen from FIG. 4. As can be seen the laser beam 18' generated by the laser 18 first passes through a grey filter 57 and is then deflected through 90° by a deflecting element 19. The beam then passes through a modulator 20 and again falls on a deflecting element 21. After renewed deflection through 90° at the deflecting element 21 the laser beam passes through a correction objective or a collimator 22 and then falls on a prism 23'. The plane of this prism is tilted with respect to the carriage so that the laser beam falls on the rotatable mirror arrangement 15 in a direction which coincides with the cylinder axis 16 of the holder 12 after two reflections at the mutually inclined side surfaces of the prism. The rotatable mirror arrangement has a rotatable mirror 15' with a flat mirror surface which subtends an angle of 45° to the axis 16 of the holder 12.

The tilted arrangement of the prism 23' ensures that the height of the laser beam 18' above the carriage 24 is increased so that it falls on the rotatable mirror 15' in the direction of the rotatable axis 16 thereof which is itself arranged somewhat higher than in the embodiment of FIGS. 1 and 2. As a result the rotatable axis 16 lies above the laterally neighbouring parts on the carriage, i.e. above the laser 18 and the collimator 22. Thus rotation of the rotatable mirror 15' through 180° about its rotational axis results in scanning or exposure of the web through a peripheral angle of 180°.

One can see from the drawing of FIG. 3, that the two guide rods 45, 46 for the carriage 24 are arranged approximately at the level of the longitudinal sides of the carriage. An easy sliding movement of the carriage along the guide rods is also ensured in this embodiment by ball bushings. The ball bushings 47, 48 are held in mounts 62, 63 which are fixedly screwed to the carriage 24. The guide rods are thus located in a region which would otherwise be empty, thus improving the compactness of the arrangement. The space beneath the carriage 24 and between the cassette receiving chambers can be used for housing associated electronics etc. In this way the space available is ideally exploited.

Finally, it will be clear that the apparatus of the invention can be used both with individual sheets of photosensitive material and with continuous webs of material, for example roll film.

I claim:

1. Optical light bead scanning arrangement for use in photocomposition apparatus with photosensitive material, the apparatus comprising a modulated laser for generating a modulated laser beam; a holder for the photosensitive material, the holder having the shape of a segment of a cylinder, whereby the photosensitive material in the holder adopts a partially cylindrical shape; a carriage; an optical image forming system and a rotatable mirror arrangement mounted on the carriage by means of which the rotatable mirror arrangement can be displaced with its axis of rotation coaxial to the cylinder axis of the holder along this cylinder axis, and wherein the laser beam, which falls on the rotatable mirror arrangement via the optical image forming system and which is substantially radially directed towards the photosensitive material in the holder after reflection at the rotatable mirror, scans the photosensitive material linewise as a result of rotation of the rotatable mirror and displacement of the carriage along the cylinder axis of the holder, and thereby generates a desired latent pattern in the photosensitive material, the laser being also fixedly arranged on the carriage and positioned alongside the rotatable mirror so as to emit light along a first light path being substantially parallel to the axis of rotation of the rotatable mirror, a 90° deflecting mirror being fixedly arranged on the carriage and forming a second light path which is perpendicular to said first light path, a laser modulator fixedly arranged on the carriage in said second light path, a further 90° deflecting mirror fixedly arranged on the carriage forming a third light path which is perpendicular to said second light path and parallel with said first light path, and a correction objective being arranged in said third light path so as to transmit the corrected light beam to said rotatable mirror.

2. An optical light bead scanning arrangement in accordance with claim 1, characterised in that the laser beam falls onto the rotatable mirror arrangement (15) in a direction which coincide with the cylinder axis (16) of the holder; and in that the rotatable mirror arrangement (15) makes effective scanning or exposure of the photosensitive material (11) possible over a peripheral angle of up to approximately 180°.

3. An optical light bead scanning arrangement in accordance with claim 2, characterised in that the rotatable mirror arranagement 15 comprises a rotatable mirror (15') with a flat mirror surface which subtents an angle of 45° to the cylinder axis (16) of the holder (12).

4. An optical light bead scanning arrangement in accordance with claim 3, characterised in that the axis of rotation (16) of the rotatable mirror arrangement (15) lies above the laterally adjacent parts (18, 22) on the carriage (24).

5. An optical light bead scanning arrangement in accordance with claim 1, characterised in that the photosensitive material is present in the form of a web (11) which comes from a supply cassette (27) arranged at one end of the holder, which is constructed as a segment (12) of a cylinder, is guided along the segment of the cylinder and is received by a take-up cassette at the other end of the holder.

6. An optical light bead scanning arrangement in accordance with claim 5, wherein the cylinder segment is transparent; and the web material is laid externally around the cylinder segment.

7. An optical light bead scanning arrangement in accordance with claim 5, characterised in that pairs of supply rollers (25) and take-off rollers (26) are provided at the ends of the cylinder segment (12) and extend parallel to the cylinder axis (16); and in that at least the take-off rollers (26) are driven by a motor.

8. An optical light bead scanning arrangement in accordance with claim 5, characterised in that a light impermeable guide cover (33) is disposed externally around the cylinder segment (12) and is spaced therefrom.

9. An optical light bead scanning arrangement in accordance with claim 8, characterised in that the guide cover (33) is pivotally mounted about a pivot axis extending parallel to the cylinder axis (16) for upward pivotal movement away from the holder.

10. Optical light bead scanning arrangement for use in photocomposition apparatus with photosensitive material, the apparatus comprising a modulated laser for generating a modulated laser beam; a holder for the photosensitive material, the holder having the shape of a segment of a cylinder, whereby the photosensitive material in the holder adopts a partially cylindrical shape; a carriage; an optical image forming system and a rotatable mirror arrangement mounted on the carriage by means of which the rotatable mirror arrangement can be displaced with its axis of rotation coaxial to the cylinder axis of the holder along this cylinder axis, and wherein the laser beam, which on the rotatable mirror arrangement via the optical image forming system and which is substantially radially directed towards the photosensitive material in the holder after reflection at the rotatable mirror, scans the photosensitive material linewise as a result of rotation of the rotatable mirror and displacement of the carriage along the cylinder axis of the holder, and thereby generates a desired latent pattern in the photosensitive material, wherein the laser is arranged on the carriage and the laser beam falls onto the rotatable mirror arrangement in a direction which coincides with the cylinder axis of the holder; wherein the rotatable mirror arrangement makes effective scanning or exposure of the photosensitive material possible over a peripheral angle of up to approximately 180° and the rotatable mirror arrangement comprises a rotatable mirror with a flat mirror surface which subtents an angle of 45° to the cylinder axis of the holder; the axis of rotation of the rotatable mirror arrangement being above the laterally adjacent parts on the carriage; the laser beam being directed onto the rotatable mirror by a prism the plane of which is tilted relative to the carriage and which brings about a deflection of the light beam through approximately 180°.

11. Optical light bead scanning arrangement for use in photocomposition apparatus with photosensitive material, the apparatus comprising a modulated laser for generating a modulated laser beam; a holder for the photosensitive material, the holder having the shape of a segment of a cylinder, whereby the photosensitive material in the holder adopts a partially cylindrical shape; a carriage; an optical image forming system and a rotatable mirror arrangement mounted on the carriage by means of which the rotatable mirror arrangement can be displaced with its axis of rotation coaxial to the cylinder axis of the holder along this cylinder axis, and wherein the laser beam, which falls on the rotatable mirror arrangement via the optical image forming system and which is substantially radially directed towards the photosensitive material in the holder after reflection at the rotatable mirror, scans the photosensitive material linewise as a result of rotation of the rotatable mirror and displacement of the carriage along the cylinder axis of the holder, and thereby generates a desired latent pattern in the photosensitive material, the laser being arranged on the carriage; the photosensitive material being present in the form of a web from a supply cassette arranged at one end of the holder and constructed as a segment of a cylinder, the web being guided along the segment of the cylinder and received by a take-up cassette at the other end of the holder; pairs of supply rollers and take-off rollers being provided at the ends of the cylinder segment and extending parallel to the cylinder axis; at least the take-off rollers are driven by a motor; and wherein the pairs of supply rollers and take-off rollers are subdivided in their longitudinal direction into several differentially drivable and/or idler sections.

12. An optical light bead scanning arrangement in accordance with claim 11, wherein the pairs of supply rollers and take-off rollers are subdivided into three directly adjacent sections of which two end sections are separately drivable and a first section is as broad as the second and third sections together.

13. An optical light bead scanning arrangement in accordance with claim 11, characterised in that at least one supply cassette (27) is arranged in front of the pair of supply rollers (25); in that at least one take-up cassette (28) is arranged after the pair of take-off rollers (26); and in that the width of the cassettes (27, 28) is the same as the width of one said sections or of a plurality of adjacent sections.

14. An optical light bead scanning arrangement in accordance with claim 13, characterised in that, for accommodating supply cassettes (27) or take-up cassettes (28) of different sizes, there is in each case provided a cassette chamber (29, 30) which is laid out to receive the largest possible size of cassette and which can be reduced to the smallest cassette size.

15. An optical light bead scanning arrangement in accordance with claim 11, characterised in that a cutting device for the photosensitive material is inserted between the pair of take-off rollers (26a, b, c) and the take-up cassette (28) or the take-up cassettes.

* * * * *